United States Patent [19]

Burdorf

[11] 4,018,402
[45] Apr. 19, 1977

[54] TAPE TRANSPORT APPARATUS

[75] Inventor: Donald L. Burdorf, Newport Beach, Calif.

[73] Assignee: BASF Aktiengesellschaft, Ludwigshafen (Rhine), Germany

[22] Filed: May 6, 1975

[21] Appl. No.: 574,958

[52] U.S. Cl. .................................. 242/192; 360/71; 242/206
[51] Int. Cl.² ..................... G03B 1/04; G11B 15/32
[58] Field of Search ................. 242/192, 201–204, 242/206, 208, 209, 210; 360/71

[56] References Cited

UNITED STATES PATENTS

| 3,482,800 | 12/1969 | Barnett et al. | 242/192 |
| 3,593,945 | 7/1971 | Richardson et al. | 242/192 |

*Primary Examiner*—Leonard D. Christian
*Attorney, Agent, or Firm*—Johnston, Keil, Thompson & Shurtleff

[57] ABSTRACT

An improved tape transport apparatus of the type in which the supply and take-up reels are simultaneously driven by surface engagement of a capstan with the outermost layer of tape on each reel. The uniform tape tension required in a system of this type is produced and maintained by the combination of a braking force on the reel acting as the supply reel and of different biasing forces which cause different deformation of the capstan at the points of surface engagement of the supply and take-up reels with the capstan. A substantially constant tension profile is obtained by balancing the tension contributed by the two types of forces. A braking/biasing unit on each of the reel shafts provides both an undirectional braking force to resist the rotation of the shaft acting as the supply shaft and the biasing forces required to produce the unequal deformation.

18 Claims, 6 Drawing Figures

TAPE TRANSPORT APPARATUS

BACKGROUND OF THE INVENTION

In general, tape transport systems in which the supply and take-up reels are simultaneously driven by surface engagement of a capstan with the outermost layer of tape on each reel require the presence of tension in the tape span between the supply and take-up reels. The tension permits the formation of a tape pack wound on a flangeless hub which will retain its physical shape without side support and also will withstand the high speeds and rapid accelerations and decelerations normally associated with this type of unit.

Some tape transports of the general type described above also require constant tension to assure uniform recording headtape contact to enable the transduction of a flutter-free signal. An example of such a type transport is disclosed in pending U.S. Application No. 388,929, now U.S. Pat. 3,921,933 filed Aug. 16, 1973, the disclosure of which is incorporated herein by reference. The tape tension in that tape transport is maintained almost entirely by braking the reel serving as the supply reel.

Known tape transports have generally relied almost exclusively on a differential deformation phenomenon. An example of such a tape transport is set forth in U.S. Pat. No. 3,370,803. By using a resilient capstan and applying a greater contact force between the take-up reel and the capstan than between the supply reel and the capstan, the resulting differential in the deformation of the capstan periphery at the two interfaces maintains tension in the tape between the supply and the take-up reels.

Each of the two tension-producing/maintaining methods have advantages and disadvantages when relied upon as the sole means of achieving the requisite constant tape tension.

Utilization of the differential deformation effect has the distinct advantage of minimal power consumption. Relying solely on the differential deformation effect is subject to certain disadvantages. For one thing, in a tape transport relying solely on the differential deformation effect, tape loops frequently develop, especially between the body of the tape pack on the supply side and the zone of interface between the tape and the capstan on the supply side. Unless the loops are straightened out, the transport action fails. Such tape loops may occur, for example, if a new pack which has not previously been passed through the transport mechanism is placed on the supply side of the apparatus or if a pack prior to its use in the transport apparatus has been in storage for a considerable length of time and for this reason has become "soft".

In such cases the required pretension level in the tape is not achieved until after the first several passes through the transport. It is during the period before which an adequate tension level is achieved that the tape loops are most likely to develop.

Another drawback of a tape drive relying on the differential deformation principle for tensioning the tape is that such a drive exhibits considerable periodic variations of the tape tension due to "run out". Any run out of the capstan, or of the reels — or more generally, the corresponding "satellite" assemblies — which is caused by tolerances in the concentricity of the hubs, tape packs or bearings, creates a change in the radial force at the interfaces between the capstan and the satellites. Also, any changes—due to manufacturing variations, wear, flat spots, etc. —in the hardness of the resilient material on the capstan (rubber tire) result in tape tension variations, and therefore flutter in the transduced signal.

As discussed above the generation of stable compressive forces of either of the two satellites against the capstan is of great importance in providing a reliable transport having low flutter and small variations in tape tension. Thus tape drive utilizing the above-mentioned differential deformation principle is particularly sensitive to the change in the compressive force between the capstan and the satellites—for the reason that in such a drive the tape tension is generated by the difference between these forces at the two interfaces.

There is a disadvantage in known tape transports which in relying solely on the differential deformation phenomenon to provide tape tension maintain a constant force differential between the supply reel and take-up reel interfaces with the capstan. It has been found that under such conditions a variation in capstan deformation occurs as the size of the reel of tape changes. Tests surprisingly indicate that given a constant contact force, a larger tape reel will produce less capstan deformation than a smaller reel. As the amount of deformation changes the tension produced by such deformation likewise changes. Therefore, in order to maintain constant tension, varying forces instead of constant forces must be employed to urge the supply and take-up reels against the capstan.

Above referenced Co-pending United States Application Ser. No. 388,929 discloses a tape transport which avoids many of the disadvantages described above by relying upon supply reel braking. The system uses a pair of unidirectional brakes, one on each reel shaft, to resist the driving of the capstan when the reel is serving as the supply reel but to allow unrestricted rotation when the reel is serving as a take-up reel.

The forces urging the supply and take-up reels toward the capstan are substantially equal to avoid any significant differential deformation and the aforementioned problems associated therewith. The problem of tape loops encountered with loosely wrapped tape packs is substantially eliminated as are the problems encountered with run out. The unidirectional brakes have a varying braking characteristic which produces a substantially constant resisting force at the point of driving contact between the supply reel and the capstan regardless of the size of the supply reel. This non-constant feature results in a nearly constant tension profile in the resulting take-up tape pack.

A major disadvantage of the system relying solely on the braking of the supply reel to maintain tension, however, is that more power is required to drive a capstan which in turn must drive a braked supply reel.

As can be seen, reliance upon either one of the two tension-producing/maintaining means has serious disadvantages. A combination of the two effects can eliminate the respective disadvantages to a certain extent. Known systems combining the two effects either have introduced new disadvantages or have not succeeded in sufficiently eliminating the disadvantages enumerated above.

For example, it is known through U.S. Pat. No. 3,638,880 to provide tape cartridges with unidirectional brakes to eliminate tape loop problems encountered when using loosely packed reels with a mechanism of the type disclosed in the earlier referenced U.S.

Pat. No. 3,370,803. The technique is expensive, however, since it requires each cartridge to be equipped with a unidirectional brake.

In addition, the brake is a constant torque device the effect of which is to increase the force required to drive the supply reel at its periphery as the supply reel decreases in size during the tape transporting operation. Such an increase in the driving force can result in a decreasing capstan driving speed due to the increased of work load on the drive motor. Even slight tape speed variations are highly undesirable in video tape recording playback systems and must be avoided.

A tape transport system utilizing unidirectional compensating brakes for reel size changes in conjunction with the differential deformation principle is disclosed in U.S. Pat. No. 3,482,800. In that system, however, the brakes only restrict the rotation of the supply reel enough to maintain a constant work load on the capstan motor in order to maintain a uniform capstan speed as the size of the supply reel varies. Separate torque motors produce the differential deformation which is the predominating tension maintaining means.

This system overcomes the disadvantage of that disclosed in U.S. Pat. No. 3,638,880 but as the brakes are not employed primarily to create tape tension but instead only to restrict the rotation of the supply reel enough to maintain a constant work load on the capstan motor as the size of the supply reel varies, the problem of component run out and its effect on tension maintenance through the differential deformation effect is still present.

In addition none of the known tape transports relying either solely or primarily on the differential deformation effect compensate for the significant variation in differential deformation which occurs due to changing reel sizes as explained above.

OBJECTS AND SUMMARY OF THE INVENTION

The general object of the present invention is to provide a tape transport apparatus of the kind defined in the initial portion of this specification which avoids the aforementioned disadvantages of the prior art.

Another object of the invention is to provide a tape transport apparatus of the kind in question in which tape tension is maintained by significant contributions from both the differential deformation principle and the braking of the supply reel.

A further object of this invention is to provide tape transport apparatus of the kind in question in which both the magnitude of the bias of the tape reels toward the capstan and the magnitude of the supply reel braking torque are varied to compensate for reel size changes during the tape transporting operation.

Still another object of the invention is to provide a tape transport of the kind in question which has the advantages of a braked supply reel without the high power requirement exhibited by systems relying solely on supply reel braking for tension maintenance.

An even further object of the invention is to provide a tape transport of the kind in question which has a capstan periphery designed to reduce the effect of reel size variation in the tension produced by the differential deformation effect.

These and other objects of the invention will be apparent from the summary below and the drawings and detailed description which follow.

The tape transport is similar in basic configuration to the one disclosed in copending United States Application No. 388,929 filed Aug. 16, 1973, now U.S. Pat. No. 3,921,933. The supply and take-up reels are rotatably mounted on slidably mounted carriages. Springs between the two carriages provide a common force with which the reels are urged toward the capstan. The braking/biasing systems on each of the two shafts serve dual purposes in contrast to the shaft brakes in the copending application. The braking effect of the braking/biasing systems is unidirectional, resulting in the resistance of rotation of only the shaft serving as supply shaft. The resisting force decreases as the size of the supply tape pack decreases to maintain the force required to drive the reel at a nearly constant level. As explained above this constant driving force facilitates driving the capstan at a uniform speed and also aids in producing a nearly constant tension component through the braking action. Unlike the brakes in the copending application, however, the braking/biasing systems in the present invention provide a bias toward the capstan to supplement the common forces produced by the springs mentioned above. The design of the braking/biasing systems is such that the unit on the shaft serving as the take-up shaft causes a significantly larger bias toward the capstan than does the unit on the shaft serving as the supply shaft. To help compensate for the change in capstan deformation resulting from reel size changes, the biasing force decreases as the take-up reel size decreases. The result is a more nearly constant differential deformation of the capstan periphery than would result given the constant differential bias used and/or possibly suggested in the prior art.

As a further measure to reduce the change in capstan deformation resulting from reel size variations, a capstan such as the type disclosed in copending United States Application No. 388,929, now U.S. Pat. No. 3,921,933 can be employed. The further reduction of the effects of changing reel size is achieved by using a capstan the periphery of which, even though it deforms radially to enable operation of tension by the differential deformation principle, has enough circumferential rigidity to attenuate the difference in deformation which would otherwise result from reel size variations.

DRAWINGS

DETAILED DESCRIPTION

Figure 1:
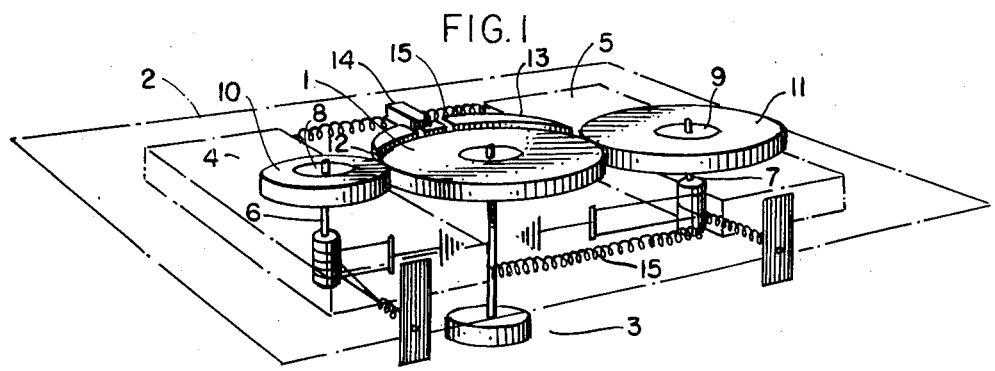
FIG. 1 is a perspective view of a tape transport apparatus according to the invention.
Figure 2:
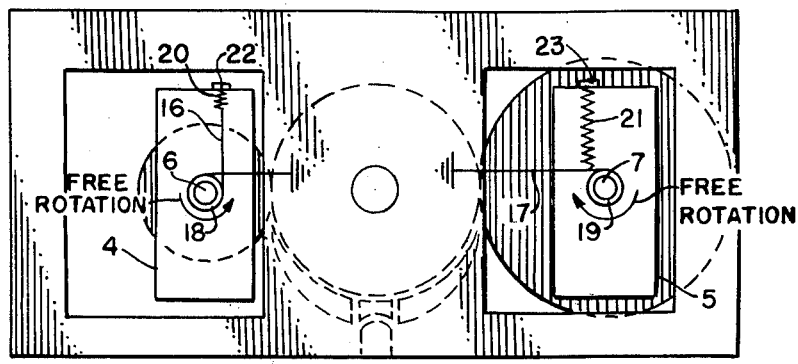
FIG. 2 is a bottom view of the tape transport apparatus shown in FIG. 1 illustrating the arrangement of the brake units.

Referring to FIGS. 1 and 2, capstan 1 is rotatably mounted to base 2 and can be driven either clockwise or counterclockwise by motor 3. Carriages 4 and 5 are slidably mounted to base 2 to permit nearly friction free translation toward and away from capstan 1. Shafts 6 and 7 are rotatably mounted to carriages 4 and 5 respectively. Hubs 8 and 9 are shown with tape reels 10 and 11 wound thereon. Span of tape 12 extends from tape reel 10 around guide 13, past head 14 to tape reel 11. Driving the tape packs by surface engagement is possible because of the contact pressure between the tape reels and the capstan generated primarily by springs 15. Tape 12 is transported left-to-right by driving capstan 1 clockwise to in turn drive tape reels 10 and 11 counterclockwise through surface engagement. Right-to-left tape transportation is accomplished by driving capstan 1 counterclockwise.

Referring to FIG. 2, the mirror image arrangement of the shaft braking/biasing system is shown. Brake bands 16 and 17, each attached to base 2, are wrapped around brake drums 18 and 19 on shafts 6 and 7 and attached to the ends of springs 20 and 21, respectively. Springs 20 and 21 are in turn fastened to brackets 22 and 23 extending from movable carriages 4 and 5, respectively.

The tension in springs 20 and 21 is dependent upon the sizes of the reels. A large reel will cause the length of the spring to increase over its small-reel length by the distance the carriage travels from its small-reel position to its large-reel position. The magnitude of the tension may be expressed by the mathematical relationship: $t_s = t_o + K\Delta x$, where $t_s$ is the tension in the spring, $t_o$ is the pre-tension in the spring with the carriage in its small-reel position, K is the spring constant and $\Delta x$ is the distance of the carriage from its small-reel position.

Figure 3:
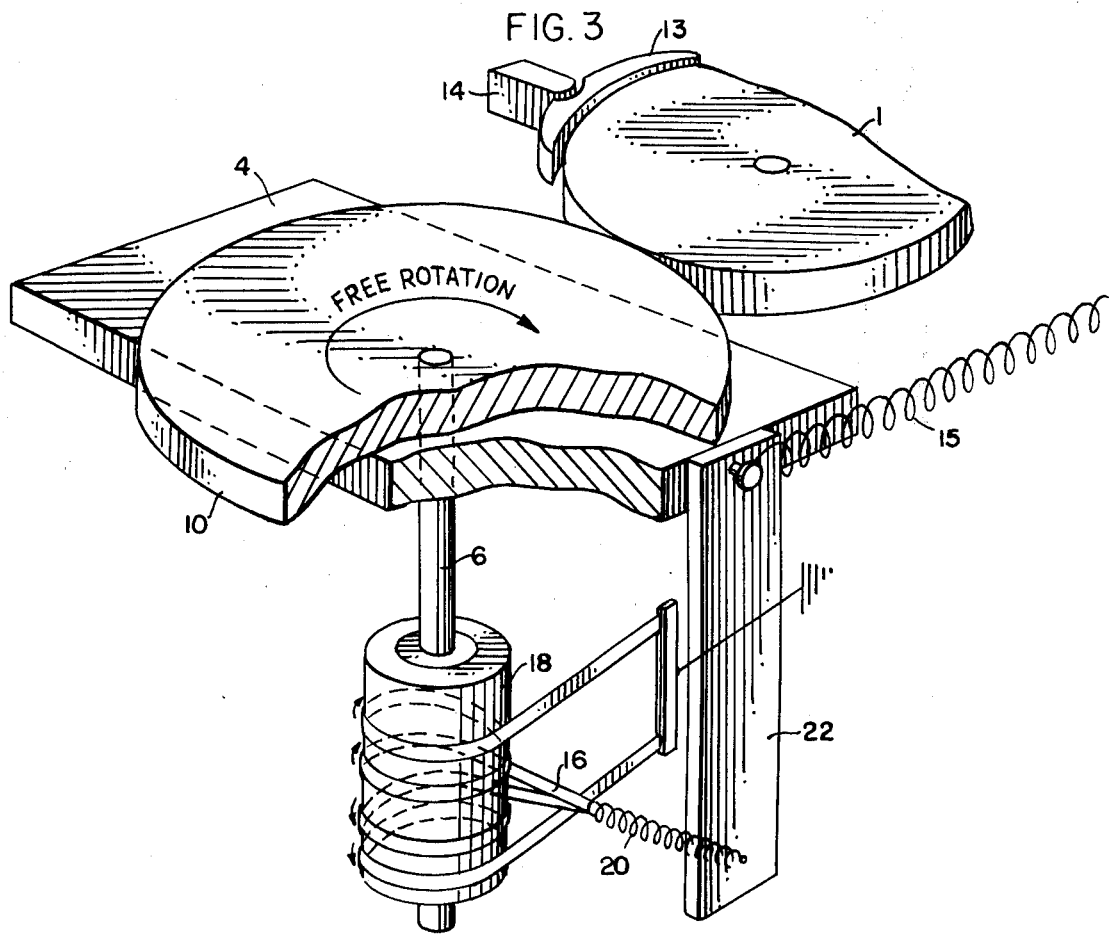
FIG. 3 is a perspective view of one of the braking/biasing units.

One-way clutches, not shown, between shaft 6 and brake drum 18 and between shaft 7 and brake drum 19 permit each of the shafts to rotate free of its drum while the reel associated therewith is serving as take-up reel. These one-way clutches may be, for example, of the design shown in, and described in detail in connection with, FIGS. 8, 9 and 10 of the above referenced U.S. application, now U.S. Pat. No. 3,921,933. As in the referenced patent, a window 102 of an insert 98 (not shown in FIG. 3 of the instant application) may then provide the brake elements with access to the outer surface of the unidirectional clutches—except that in the embodiment shown in FIGS. 1 to 3 of the present application the brake elements, as mentioned, are in the form of brake bands 16 and 17, rather than in the form of brake arms 31 and 131 as in the U.S. patent.

While a reel is serving as take-up reel, its associated drum remains stationary due to the action of the brake band and the tension in the spring is transmitted substantially unchanged to the base-end of the brake band. The existence of the tension between the base 2 and the carriage results in a supplemental bias of the take-up reel toward the capstan equal to the tension in the brake band spring.

On the other hand, while a reel is serving as supply reel, its associated clutch forces the drum to rotate in unison with the shaft. As a result of the frictional contact between the tensioned brake band and the rotating drum a force resisting rotation not only tends to brake the reel acting as supply reel but also causes a reduction in the tension at the end of the band attached to the base 2. Therefore, where the tension in the base-end of the brake band is essentially equal to the tension in the spring when its associated reel is serving as take-up reel, the tension in the base-end of the brake band is significantly reduced over the tension in the spring when its associated reel is serving as supply reel. Hence, given equal supply and take-up reel sizes the take-up reel will be more forcefully urged toward the capstan than will the supply reel. This force differential creates the differential deformation of the capstan which produces one component of the tape tension. As explained above, another component of tape tension is produced directly by the braking of the supply reel.

As the reel sizes change, the magnitudes of the biasing and braking forces also change in a manner designed to maintain the deformation of the capstan and the force required to drive the supply reel at nearly constant levels. This is a very advantageous capability neither taught nor suggested by the prior art. For example, U.S. Pat. No. 3,370,804 discloses a biasing system utilizing bands wrapped around both of the reel shafts for the stated purpose of affecting biasing the shafts toward or away from the capstan depending upon whether a particular shaft is serving the take-up reel or the supply reel. In that disclosure, however, the biasing system lacks several significant features of the present invention. Not only is there no brake drum to facilitate the generation of significant braking forces, the shafts are necked down to reduce the braking. In addition, the prior art device lacks the unidirectional feature to eliminate entirely the braking on the take-up reel shaft. Finally, and most significantly, neither the biasing nor the braking, to the extent it is present, is variable with the reel size.

Figure 4A:
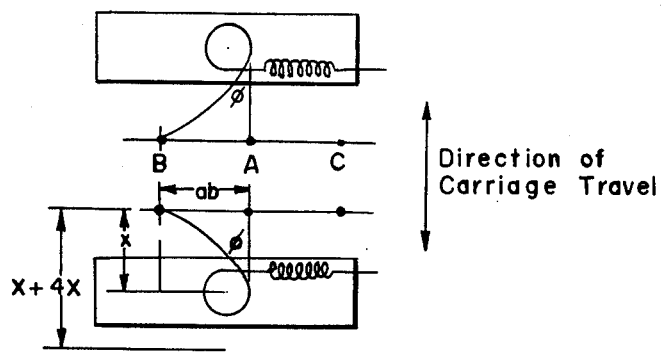
FIGS. 4a and 4b show several alternative embodiments of the braking/biasing units.

With the improved braking/biasing system of this invention, the relative contributions and rates of change of the braking and biasing can be adjusted by relocating the points of attachment of either the base-ends of the bands or the springs, or both. FIG. 4a illustrates alternative points of attachment for the base-ends of bands to reduce the level of biasing given a level of braking. To illustrate, with the bands attached at points B instead of points A the direction of pull of the bands is no longer aligned with the direction of carriage travel as was the case in FIGS. 1 to 3. Instead of the bias of the carriages toward the capstan being simply the tension in the base-ends of the bands, the bias is reduced to only that component of the band tension acting in the direction of carriage movement or $t_b \cos\phi$, where $t_b$ is the tension in the base end of the band and $\phi$ is the angle between the band and the direction of carriage travel. A similar result would be obtained by attaching the bands at points C.

Relocating the points of attachment of the bands also affects the rates of change of both the biasing and braking. The spring tension can be expressed as $t_s = f_o + K\Delta y$ where $\Delta y$ is the amount by which the spring is stretched as its associated carriage is moved from its small reel position. A geometrical analysis yields the following relationship $\Delta y = \sqrt{(ab)^2 + (X+\Delta X)^2} - \sqrt{(ab)^2 + X^2}$ Therefore where $\Delta y$ is not simply $\Delta X$, as in FIGS. 1 through 3 when $\phi$ was 0°, the rate of change of the biasing and the braking resulting from reel size variations is decreased.

Figure 4B:
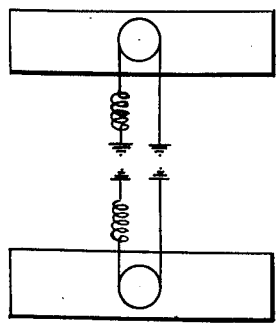

FIG. 4b illustrates a band arrangement which increases the level of biasing given a level of braking. With both the base end and the spring attached to base 2, the bias toward the capstan is increased by having the spring tension contribute to the bias as well as the tension in the base end of the band. Another significant effect of such an arrangement is that the rates of change of the braking and biasing is effectively doubled since the tension in the spring varies according to the relationship $f_s = f_o + ZK\Delta X$ instead of $f_s = f_o + K\Delta X$ as in the embodiment shown in FIGS. 1 through 3.

It is obvious that the points of attachment of the base ends and the spring in the embodiment shown in FIG. 4b could be relocated in a manner similar to that shown in FIG. 4a to achieve further adjustment of the relative contributions of the braking and biasing.

To further assist the improved tape transport in maintaining substantially constant tension in the span of tape between the supply and take-up reels, a capstan exhibiting special features may be used. The criterion to be met by the capstan is minimal change in deformation given a constant contact force and varying tape reel size.

The physical characteristics required to meet this criterion are radial resiliency and circumferential rigidity. The radial resiliency permits the desired local acceleration of the capstan periphery, while the circumferential rigidity minimizes the change in such acceleration resulting from contact of the capstan with a reel of changing size.

Figure 5:
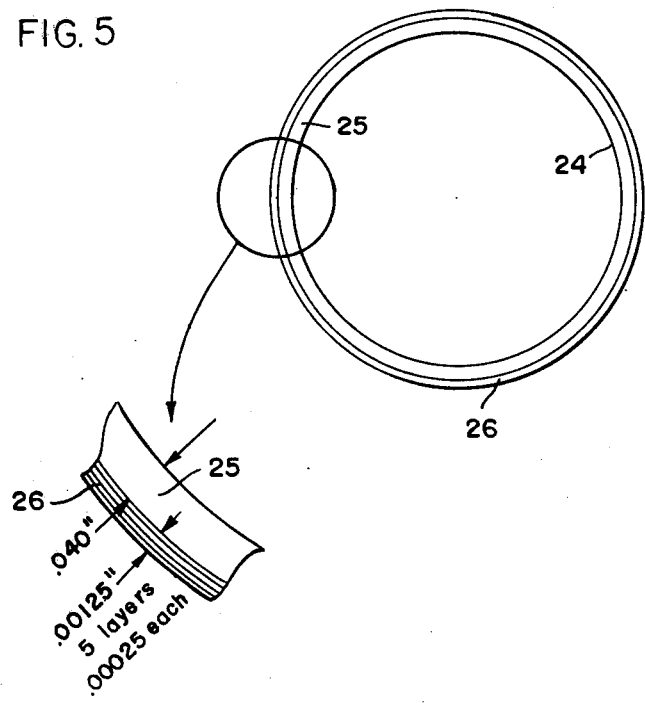
FIG. 5 shows a preferred embodiment of the capstan.

FIG. 5 shows a preferred embodiment of a capstan exhibiting the desired characteristics. The capstan has a rigid inner spool 24, the periphery of which has a 0.040 inch thick elastic rubber coating 25 with four belts of 0.00025 inch thick mylar splicing tape 26. In the above-mentioned pending application 388,929 a particular capstan construction which uses no, or only a negligible amount of, rubber coating around a rigid inner spool was utilized to improve the frequency response of the tape transport. Subsequent to that application it was found, surprisingly, that the mylar belts had the further advantage, described above, of reducing the deformation due to changing reel size experienced with known resilient capstans.

Tests using a tape transport apparatus equipped with the variable braking/biasing assemblies alone and also in conjunction with the capstan described above resulted in more constant tape tension than capable with known systems while eliminating the numerous disadvantages described above.

The description in detail may suggest various changes and other departures within the spirit and scope of the appended claims. For example, while in the embodiment shown in FIG. 5 a five-belted capstan has been shown, it should be understood that this number of belts is not to be understood in a limiting sense. For instance, satisfactory results have also been obtained with a capstan equipped with the belts.

The invention is hereby claimed as follows:

1. A method of tensioning the tape in a tape transport of the type having supply and take-up reels on shafts rotatably mounted on supports movable toward and away from a rotatably mounted driving capstan having a resiliently deformable peripheral portion which comprises:
    braking said supply reel, thereby generating a first tensioning component in the span of tape between said supply reel and said take-up reel,
    simultaneously therewith creating a greater bias between said take-up reel and said capstan than between said supply reel and said capstan, said difference in bias producing and corresponding difference in the deformation of the periphery of said capstan, said difference in deformation generating a second tensioning component in the span of tape between said supply reel and said take-up reel, and
    automatically varying the braking of said supply reel as well as the creation of the bias of both said take-up reel and said supply reel as a function of reel size diameter,
    so as to maintain the tape tension in the span of tape at a substantially constant level during the tape transporting operation.

2. A method as set forth in claim 1 wherein the magnitude of said first tensioning component at least equals the magnitude of said second tensioning component.

3. A method as set forth in claim 1 wherein the magnitude of the braking of the supply reel decreases in substantially indirect proportion to the diameter of the supply reel whereby the force required to drive the periphery of the supply reel is maintained at a substantially constant level.

4. A method as set forth in claim 1 wherein the magnitude of the bias of said take-up reel increases and that of said supply reel decreases as the size of said two reels increases and decreases respectively, whereby the magnitude of the differential deformation of the capstan periphery is maintained at a substantially constant level throughout the tape transportation operation.

5. In a reversible tape transport of the type having reels which alternately serve as supply and take-up reels on shafts rotatably mounted on supports movable toward and away from a driving capstan having a resiliently deformable peripheral portion and being rotatably mounted on the tape transport base,
    the improvement that said transport comprises:
    a coupling means including a unidirectional clutch on each of said shafts, each said coupling means having an element coaxial with the corresponding shaft and arranged for free rotation in one direction, and
    an elongated flexible brake member/resilient means combination for each of said shafts, both ends of said combination being anchored at said tape transport and at least one of said ends at said base thereof, and each said flexible brake member being at least partially wrapped around said one element of the corresponding coupling means,
    such that, due to the joint action of said coupling means and said brake member/resilient means combination, a braking action is exerted substantially on the rotation of said supply reel only, thereby to create a first tensioning component in the span of tape between said supply reel and said take-up reel, and simultaneously a bias is generated between said reels and said capstan which bias is greater between said take-up reel and said capstan than between said supply reel and said capstan, thereby to create, by virtue of the resultant difference in the deformation of the periphery of said capstan at the interfaces between said reels and said capstan, a second tensioning component in said span of tape.

6. In a tape transport as set forth in claim 5, the improvement wherein each said combination has a variable characteristic such that the sum of said first and second tensioning components is kept substantially constant during the tape transporting operation.

7. In a reversible tape transport of the type having reels which alternately serve as supply and take-up reels on shafts rotatably mounted on supports movable toward and away from a driving capstan having a resiliently deformable peripheral portion and being rotatably mounted on the tape transport base,
    the improvement which comprises in combination:
    unidirectional braking means on each of said shafts to brake said shaft only when it serves as a supply shaft, said braking means resisting the rotation of said supply reel to generate a first tensioning component in the span of tape between said supply reel and said take-up reel;

biasing means on each of said shafts for generating bias between said reels and said capstan, said biasing means being sensitive to the direction of rotation of said shafts, the direction-sensitive biasing means on the shaft serving the take-up reel generating a greater bias between said take-up reel and said capstan than is generated between said supply reel and said capstan, said difference in bias producing a corresponding difference in the deformation of the periphery of said capstan at the interfaces between said reels and said capstan, and said difference in deformation generating a second tensioning component in the span of tape between said supply reel and said take-up reel;

the characteristics of said braking and biasing means being such that the sum of said first and second tensioning components is kept substantially constant during the tape transporting operation, and each of said biasing means having a variable biasing characteristic such that the difference in deformation of the capstan periphery at the interfaces between said reels and said capstan is maintained at a substantially constant level as the sizes of said supply and take-up reels vary during said operation.

8. In a tape transport as set forth in claim 7 wherein the improvement further comprises a capstan having a periphery exhibiting resilience in the radial direction but rigidity in the circumferential direction.

9. In a tape transport as set forth in claim 8 the improvement wherein said capstan comprises a rigid outer spool;

an elastic rubber coating around the periphery of said spool; and a layer of mylar splicing tape over said elastic rubber coating.

10. In a tape transport as set forth in claim 7 the improvement wherein said braking means and said biasing means are single units on each of the two said shafts.

11. In a tape transport as set forth in claim 10 the improvement wherein each of said braking/biasing means comprises:

a brake drum on said shaft, said drum being mounted coaxial with said shaft;

a brake band having two ends, the first of said ends of said brake band being connected to one end of a tension spring, the other end of said tension spring being attached to said movable support of said shaft, the second of said ends of said brake band being attached directly to said base of said transport apparatus, said brake band being wrapped around and in frictional contact with said drum, whereby movement of said shaft away from said capstan causes the length of and, consequently the tension in, said spring to increase at a rate less than or equal to the rate of movement of said shaft away from said capstan.

12. In a tape transport as set forth in claim 11 the improvement wherein in each of said braking/biasing means a one-way clutch is interposed between said shaft and said brake drum whereby said shaft can rotate free of said drum in one direction but cannot rotate in the opposite direction without causing said drum to rotate.

13. In a tape transport as set forth in claim 12 the improvement wherein in each of said braking/biasing means the direction of free rotation of said shaft with respect to said drum is the direction said shaft rotates when the reel associated with said shaft is serving as take-up reel.

14. In a tape transport as set forth in claim 11 the improvement wherein in each of said braking/biasing means the point of attachment to the base of the second of said ends of said brake band is such that the segment of brake band between grid drum and grid base is substantially parallel to the direction of movement of the associated shaft toward and away from said capstan.

15. In a tape transport as set forth in claim 11 the improvement wherein in each of said braking/biasing means the point of attachment to the base of the second of said ends of said brake band is such that the segment of brake band between said drum and said base is at an angle to the direction of movement of the associated shaft toward and away from said capstan.

16. In a tape transport as set forth in claim 10 the improvement wherein each of said braking/biasing means comprises;

a brake drum on said shaft, said drum being mounted coaxial with said shaft;

a brake band having two ends, the first of said ends of said brake band being connected to one end of a tension spring, the other end of said tension spring being attached to said base of said transport apparatus, the second of said ends of said brake band being attached directly to said base of said transport apparatus, said brake band being wrapped around and in frictional contact with said drum, whereby movement of said shaft away from said capstan causes the length of, and consequently the tension in, said spring to increase at a rate equal to or greater than the rate of movement of said shaft away from said capstan.

17. In a tape transport as set forth in claim 16 the improvement wherein in each of said braking/biasing means a one-way clutch is interposed between said shaft and said brake drum whereby said shaft can rotate free of said drum in one direction but cannot rotate in the opposite direction without causing said drum to rotate.

18. In a tape transport as set forth in claim 17 the improvement wherein in each of said braking/biasing means the direction of free rotation of said shaft with respect to said drum is the direction said shaft rotates when the reel associated with said shaft is serving as take-up reel.

* * * * *